(12) United States Patent
Cloake

(10) Patent No.: US 9,816,900 B2
(45) Date of Patent: Nov. 14, 2017

(54) METHOD OF MEASURING EQUIPMENT PERFORMANCE AND DEVICE THEREFOR

(71) Applicant: Martin Cloake, Ottawa (CA)

(72) Inventor: Martin Cloake, Ottawa (CA)

(73) Assignee: Raven Telemetry Inc., Ottawa, Ontario (CA)

( * ) Notice: Subject to any disclaimer, the term of this patent is extended or adjusted under 35 U.S.C. 154(b) by 0 days.

(21) Appl. No.: 14/515,517

(22) Filed: Oct. 16, 2014

(65) Prior Publication Data
US 2016/0377509 A1    Dec. 29, 2016

Related U.S. Application Data

(60) Provisional application No. 61/891,782, filed on Oct. 16, 2013.

(51) Int. Cl.
*G01M 99/00* (2011.01)
*G06Q 10/00* (2012.01)
*G06Q 10/10* (2012.01)
*H04W 4/00* (2009.01)

(52) U.S. Cl.
CPC ........ *G01M 99/005* (2013.01); *G01M 99/008* (2013.01); *G06Q 10/1097* (2013.01); *G06Q 10/20* (2013.01); *H04W 4/005* (2013.01)

(58) Field of Classification Search
CPC .. G01M 99/005; G01M 99/008; G06Q 10/97; G06Q 10/20; H04W 4/005
See application file for complete search history.

(56) References Cited

PUBLICATIONS

Bustillo et al., A Virtual Sensor for Online Fault Detection of Multitooth-Tools, Published on Mar. 2, 2011, Sensors 2011, vol. 11, pp. 2773-2795.*

* cited by examiner

*Primary Examiner* — Toan Le
(74) *Attorney, Agent, or Firm* — Ovodenovo Inc.

(57) ABSTRACT

A device for measuring equipment performance having one or more sensors that measure functionality of equipment without interactive communication between the sensors and equipment. The one or more sensors generate and transmit data related to functionality of the equipment to a microprocessor. The microprocessor contains an algorithm that converts the data related to functionality of the equipment into equipment utilization metrics. These equipment utilization metrics are transmitted by a transmitter to an equipment operator.

18 Claims, 8 Drawing Sheets

METHOD OF MEASURING EQUIPMENT PERFORMANCE AND DEVICE THEREFOR

TECHNICAL FIELD

The present invention relates generally to the field of equipment monitoring systems and in particular to a method and device to measure and report equipment functionality and efficiency.

BACKGROUND OF THE INVENTION

In manufacturing facilities, the effective use of equipment is an important factor in determining operational performance and production line efficiency. With increased global competition, maximizing the efficiency of all assets within a manufacturing plant is key to determine economic viability. One commonly used measure to track equipment utilization is Overall Equipment Effectiveness (OEE). OEE is a measure of the time the equipment is used compared to the time the equipment is available. This value is then multiplied by the Quality %, the % of product produced that meets pre-determined quality control standards, to determine the % of time that the equipment is being used to produce good product:

OEE=(Time Equipment is Operational)/(Time equipment is available)*(Quality %)

There are many ways to measure production line efficiency. One method is to manually time all the process steps required to produce product. This process is time consuming and prone to error. One of the simplest ways to measure production line efficiency is to measure the efficiency of the bottleneck operation. A bottleneck is a phenomenon where the performance or capacity of an entire system is limited by a single or limited number of components or resources. The term bottleneck is taken from the "assets are water" metaphor. As water is poured out of a bottle, the flow rate is limited by the width of the exit, that is, the bottleneck. By increasing the width of the bottleneck one can increase the rate at which the water flows out of the bottle. Such limiting components of a system are sometimes referred to as bottleneck points. In many production lines, the bottleneck operation can be traced to an operation performed on a given machine or piece of industrial equipment. The use of technology to acquire performance metrics from industrial equipment and to transmit these parameters to those responsible for equipment performance, possibly plant or operations managers or employees operating the equipment, has been available for many years. These systems are designed to communicate directly with the equipment's processor and PLCs (programmable logic controllers). This communication is typically referred to as Machine-to-Machine (M2M) communications. This information is typically transmitted to enterprise resource planning (ERP) software to be stored and analysed. The hardware infrastructure required to obtain this information is costly and software customization is required to be able to communicate with each piece of equipment.

The main elements involved in making M2M communication systems work are sensors, a wireless network and a computing device connected to the Internet. Typically, the sensors used in known M2M communications are those that can send telemetry data wirelessly.

M2M communication is generally referred to as "telemetry." The concept of telemetry, where remote machines and sensors collect and send data to a central point for analysis, either by humans or computers, isn't new. New networking technology has allowed this concept to be taken to a new level.

Three very common technologies a) wireless sensors b) the Internet and c) computing devices, are coming together to create a new type of M2M communication. The use of such common technologies holds great promise in promoting telemetry's use by businesses, government and private individuals.

M2M communication systems can be used to more efficiently monitor critical public infrastructure, such as water treatment facilities or bridges, with less human intervention. M2M communications can help businesses maintain inventory or make it easier for scientists to perform research. Because this new form of M2M communications can rely on common technology, it is less cost prohibitive for smaller businesses.

M2M communication systems expand telemetry's role beyond its common use in science and engineering and places it in an everyday setting. People are already using M2M communications, but there are many more potential applications as wireless sensor technology, networks and computers improve and the concept is mated with other technology. M2M communications generally gather data and send it wirelessly to a network. It is then typically routed, often through the Internet, to a server or database. At the server or database, the data may be analyzed and acted upon, according to the software in place.

Older systems worked similarly, using "telemetry." Telemetry technology, in many ways, was the forerunner of the more advanced M2M communications. Both telemetry communications and M2M communications collect data through sensors. The major difference between the two is that rather than a random radio signal typically used in telemetry communication, M2M communications use existing networks, such as wireless networks used by the public, to transmit the data.

In the past, telemetry communications were mostly used by scientists, governments and other organizations. Telemetry communications were used in applications as diverse as aerospace, agriculture, water treatment monitoring and wildlife science.

The sensors in known telemetry communications, however, were highly specialized and often needed high voltage or high current power sources to transmit data. Furthermore, data collection could be problematic if a remote sensor was located in a dead spot, which is a location where the sensor cannot transmit the data properly due to a lack of network coverage. In addition, the data analysis for these systems was conducted by what are now consider antiquated computers.

Modern M2M communications represent vast improvements over these systems. Remote sensor technology advances offer increased sensitivity and accuracy with lower voltage and current requirements. Analyzing computing devices and software also work at a faster pace. Also, with the advent of cloud computing, access to vast amounts of processing power is facilitated. The explosive growth of public wireless networks is likely the biggest change that has opened M2M communications to many more sectors.

Using wireless networks makes it easier to transmit telemetry for several reasons. Among other reasons, radio signals don't need to be as powerful as they once did, as cellular towers are densely spread over large areas to provide coverage and decrease the distance a signal must be transmitted. Known telemetry systems didn't always rely on radio signals, some used dedicated phone lines, for instance, but the wireless aspect allows for easier remote placement of sensors.

Known data acquisition systems track energy consumption for the purpose of minimizing energy use at peak hours. For example, U.S. patent application Ser. No. 12/429,821, filed Oct. 28, 2010 by Rockwell Automation Technologies Inc. entitled "Discrete energy assignments for manufacturing specifications". However the system described in this patent application requires that the hardware and software need to be adapted to function with different equipment. The costs associated with the customisation of hardware and software for each piece of equipment make this type of system prohibitive to many potential users.

In addition to functional limitations, many known device networking, communication, and control systems are prohibitively expensive. Some systems require coupling complex electronics requiring significant processing and data storage capabilities into every device on the network. Other known systems require users to place full-scale servers in a home network to control the home devices on the network. Almost all known systems are too expensive for widespread adoption by most consumers, require excessive space, energy, and upkeep, and are too complicated to integrate into the manufacturing systems of many devices and appliances. This is especially true for manufacturing systems use to manufacture smaller or cheaper devices whose cost will increase by a proportionally greater fraction when the networking hardware and/or software are included.

The ability to provide the flow of actionable data from industrial equipment, including legacy equipment, to those responsible for the equipment in a relatively cost-effective and intuitive manner remains highly desirable.

SUMMARY OF THE INVENTION

In accordance with an aspect of the present invention, there is provided a method for measuring equipment performance. The method having the steps of collecting data pertaining to functionality of one or more pieces of equipment by one or more sensors without interactive communication between the one or more sensors and the one or more pieces of equipment; communicating the data pertaining to functionality of the one or more pieces of equipment to a microprocessor; converting the data pertaining to functionality of one or more pieces of equipment using an algorithm within the microprocessor into equipment utilization metrics; and transmitting the equipment utilization metrics to an equipment operator by a transmitter.

In accordance with another aspect of the present invention, there is provided a device for measuring equipment performance, the device having one or more sensors that measure functionality of equipment without interactive communication between the one or more sensors and the equipment and generate and transmit data related to functionality of the equipment; a microprocessor containing an algorithm for receiving the data related to functionality of the equipment, converting the data related to functionality of the equipment into equipment utilization metrics and transmitting the equipment utilization metrics; and a transmitter for receiving the equipment utilization metrics and transmitting the equipment utilization metrics to an equipment operator.

In accordance with another aspect of the present invention, there is provided a device for measuring equipment performance, the device having one or more sensors that measure functionality of equipment without interactive communication between the sensor and the equipment and generate and transmit data related to functionality of equipment.

BRIEF DESCRIPTION OF THE DRAWINGS

Further features and advantages of the present technology will become apparent from the following detailed description, taken in combination with the appended drawings, in which.

DETAILED DESCRIPTION OF THE INVENTION

Figure 1:
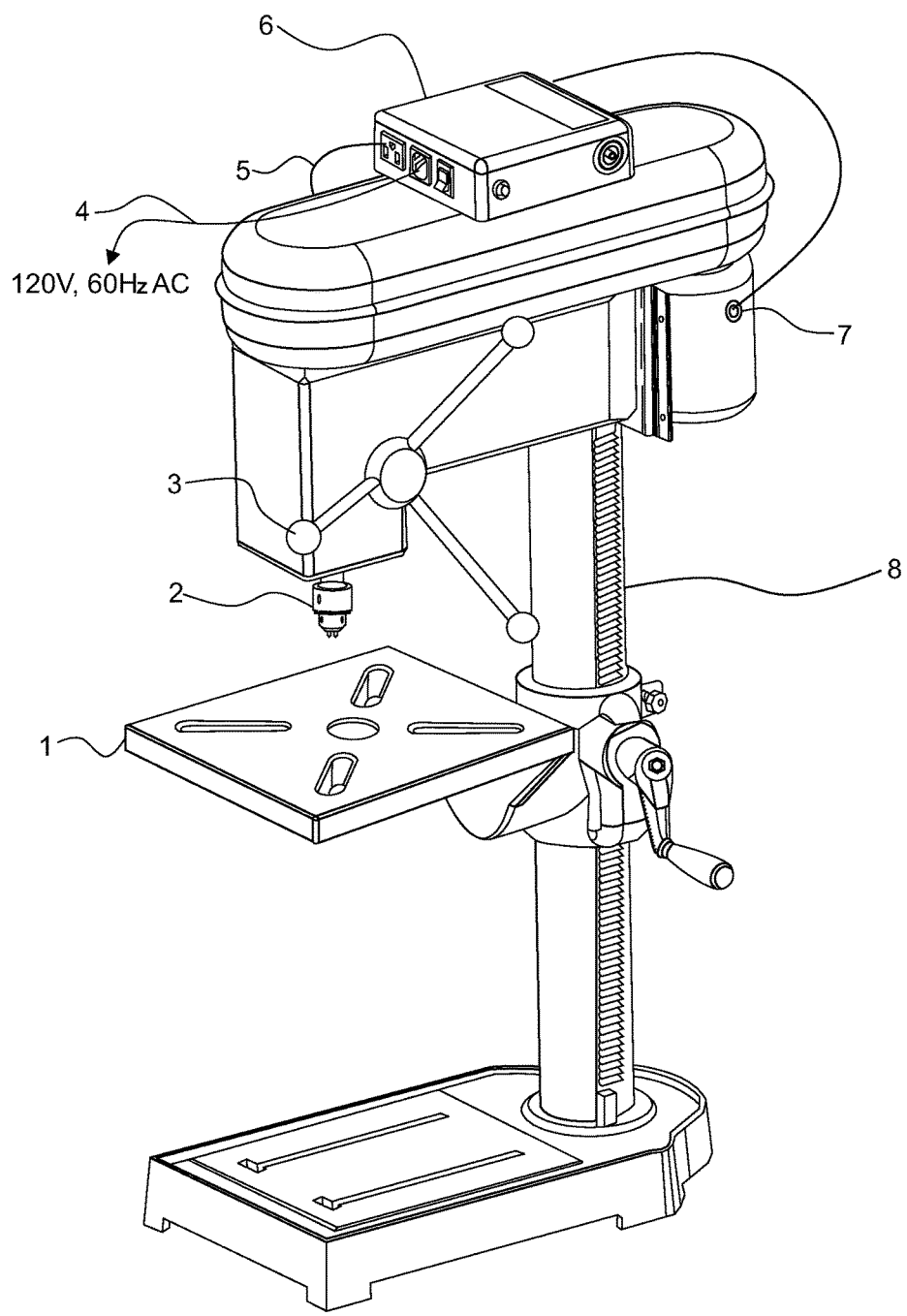
FIG. 1 is an isometric view of a drill press connected to a measurement device in accordance with at least one embodiment of the present invention.

The current paradigm for industrial equipment monitoring is to communicate directly with the equipment. This direct communication requires that the sensing hardware and software be compatible with the equipment's communication protocols. Currently, there is no standard method of communication. This lack of a standard method of communication results in needing to continuously make changes to the data acquisition hardware and software as new equipment is added to a manufacturing facility. In addition, some older equipment does not have any method to communicate with other devices. For this reason, it is advantageous to have a system that is able to measure equipment performance without direct communication with the equipment and to be able to transmit this information to those responsible for the equipment. Accurate monitoring of equipment performance metrics can be used to monitor and potentially improve equipment utilization and ultimately operational efficiency.

An embodiment of the present invention provides, in general, a device comprising a sensor, a micro-processor and a transmitter. The sensor obtains measurement associated with equipment utilization and functionality by collecting information without interactive communication with the equipment. Equipment utilization is defined as the portion of time that equipment is performing useful work in relation to the total time that the equipment is available for work. Equipment utilization metrics comprise data or information that relates to the equipment utilization. Any equipment utilization metric may be utilized, including OEE and any other relevant values as would be recognized by a person skilled in the art. For example, Applied to a milling machine, the time that the machine is cutting metal or moving to a new position is considered to be useful work; when the machine spindle is off, that is considered to be idle time. The time that the equipment is available for work is the sum of the idle time and the time that equipment is performing useful work. Maximizing the time that the machine is performing useful work is highly desirable.

In another embodiment of the invention, the device consists of a microprocessor, power supply, data transmitters, temperature sensor and current sensor as well as connectors to accept a power supply plug, such as a 120V NEMA 5-15 connector. Any other power supply plug may be utilized as recognized by a person skilled in the art. Industrial equipment is connected to the device by plugging the power cable of the industrial equipment into the NEMA 5-15 Connector. In addition, the temperature sensor is connected to the industrial equipment in an area where large thermal changes occur during use. When the industrial equipment is in use, the energy consumed is greater than when not in use. Within the device, the positive lead from the 120V connector passes through the active sensing region of the current sensor. The current sensor is used to transmit current consumption information to the microprocessor. A software algorithm on the microprocessor converts the energy consumption information to equipment utilization metrics. Similarly, when the industrial equipment is in use, the amount of heat produced by certain components is different than when not in use. The temperature sensor, which may be a thermistor or any other device known to one skilled in the art for sensing temperature, is used to transmit the temperature information to the microprocessor. Software algorithms on the microprocessor convert the thermal information to equipment utilization metrics. The data transmitters transmit equipment utilization metrics to an equipment operator, who may be a plant or operations managers or employees operating the equipment. The equipment utilization metrics may be transmitted to an equipment operator by way any means know to known to one skilled in the art, including public and private wireless networks, wired networks, cellular networks and may comprise cloud computing networks, the internet, offsite servers, cellular telephones, web portals and/or local computer terminals as a means of transmitting, storing and displaying the equipment utilization metrics to an equipment operators.

In one embodiment of this invention, the 120V NEMA 5-15 connector is replaced with a removable current sensor that is able to be attached to equipment that does not have a NEMA 5-15 connector.

In another variant, sensors are added to detect changes in sound, light, EM radiation, vibration, force, acceleration and/or air flow. Similar to previously described embodiments of the invention, these measurements can be used to infer equipment utilization and functionality.

To the accomplishment of the foregoing and related ends, the following description and annexed drawings set forth in detail certain illustrative aspects. These aspects are indicative of but a few of the various ways in which the principles described herein may be employed. Other advantages and novel features may become apparent from the following detailed description when considered in conjunction with the drawings.

One aspect of the present invention provides a device for monitoring, measuring and tracking performance of industrial or commercial equipment: the sensor system comprising a) a sensor that can detect changes to the equipment by collecting information without interactive communication with the equipment, b) a microprocessor to algorithmically correlate the changes detected to different type of equipment performance (on-idle, on-active, off), and c) a transmitter to send the performance data to the equipment operator.

Additional Features of the Invention

In another embodiment of the present invention, the sensor used to measure equipment functionality is a temperature sensor. The temperature sensor is installed near to or within the equipment, in a region where the temperature varies directly with equipment use. An example of this would be an industrial oven where one or more sensors may be placed inside the heat chamber of the oven. A minimum temperature threshold is established to differentiate between time when the oven is on and when it is idle.

In another embodiment of the present invention the sensor used to measure equipment performance is an optical motion sensor. Most industrial equipment has at least one moving part when in operation. The sensor may be installed in a region of the equipment where it can detect if the motion is occurring. An example of this is a circular saw where the sensor was placed in a position to detect if the blade was spinning. In this example spinning would indicate that the saw was performing useful work.

In a variation of this embodiment of the present invention, the motion sensor is a mechanical motion sensor.

In another variation of this embodiment of the present invention, the motion sensor is an optical sensor capturing video.

In another embodiment of the present invention, the sensor used to measure equipment functionality is a microphone. Most industrial equipment makes noise during operation that is different that the noise produced when idle. The sensor may be installed in a region of the equipment in close proximity to the regions that produce noise during operation. A microprocessor is able to determine algorithmically which noise corresponds to active use. The microprocessor is also able to algorithmically filter out noise, both variable and constant, that is not associated with equipment functionality. An example of this is a milling machine where the sensor is able to detect the noise produced when the milling machine is actively cutting metal.

In another embodiment of the present invention, the sensor used to measure equipment performance is a light detector. Most industrial equipment produces light during operation. The sensor may be installed in a region of the equipment in close proximity to a region that produces light during operation. An example of this is an industrial SMT (Surface Mount) pick and place PCB (printed circuit board) manufacturing machine. The sensor is attached in close proximity to an indicator light (possibly an LED—Light emitting diode) where the state of the light is directly related to equipment functionality.

In another embodiment of the present invention, the sensor used to measure equipment performance is an airflow sensor. Some industrial equipment have fans or blowers whose operating state is directly related to equipment functionality. An example of this is an industrial HVAC (heating ventilation and air conditioning) system where fans are used to control air flow during operation. In this example, increased air flow would indicate that the system is in use.

In another embodiment of the present invention, the sensor used to measure equipment performance is an electro-magnetic radiation detector. Many pieces of industrial equipment have motors. The sensor may be installed in close proximity to the motor so that it is able to detect when the motor is spinning. An example of this is an industrial lathe where rotary motion of the motor correlates to equipment use.

In another embodiment of the present invention, multiple sensors are used in conjunction to determine equipment utilization. The efficiency of most equipment varies with the temperature of the equipment. As the temperature rises, generally, the equipment is less efficient. In some cases the change in efficiency of the equipment due to thermal changes is so great that it makes it difficult to determine if there are electrical changes indicating changes in equipment use. The microprocessor is able to algorithmically deduce the changes in energy consumption due to active use of the machine by algorithmically disregarding the contribution from thermal variation. An example of this is a drill press where the temperature of the device increases over time until steady state (constant) temperature is achieved.

In another embodiment of the present invention, a sensor is used to obtain information relating to the equipment's maintenance requirements. An example of this is a grinding machine. The amount of energy required to power the grinder when it is on but not actively grinding will increase as the internal friction in the system increases. Over time, the internal friction in the system will cause components of the grinder to wear out. In addition, the internal friction will cause the system to run at a higher temperature which results in the motor used to drive the grinder requiring more energy. The information obtained by the sensor pertaining to energy usage can be interpreted algorithmically by the microprocessor to define when the system requires maintenance.

In another embodiment of the present invention, information from multiple sensors can be used in conjunction to algorithmically define when the systems requires maintenance.

In another embodiment of the present invention, the sensor can be used to determine the quantity of use in order to be able determine when to perform preventative maintenance. Preventative maintenance is defined as maintenance activities that occur before there is any significant evidence of system wear. The goal of preventative maintenance is to prevent system failures. Comparing equipment utilization metrics to known service intervals, which includes the number of hours between preventative maintenance events, an algorithm generates equipment maintenance metrics, which include number of hours to service interval, number of hours past service interval, and any other equipment maintenance metrics recognized by a person skilled in the art. A maintenance notification is transmitted to an equipment operator regarding scheduled preventative maintenance wherein the maintenance notification includes equipment maintenance metrics.

EXAMPLES

Example 1—Measurement of Drill Press Performance

An implementation of an embodiment of the invention for the measurement of drill press performance is shown in FIG. 1. FIG. 1 shows a 4.1 A 10" drill press 8 (Mastercraft part #055-5509-2) connected to the NEMA 5-15 Receptacle 5 and the power cable 4 for the device 6 was plugged into a standard 120V, 15 A wall outlet. The temperature sensor 7 was connected to the metal housing of the spindle of the drill press using adhesive tape.

Figure 2:
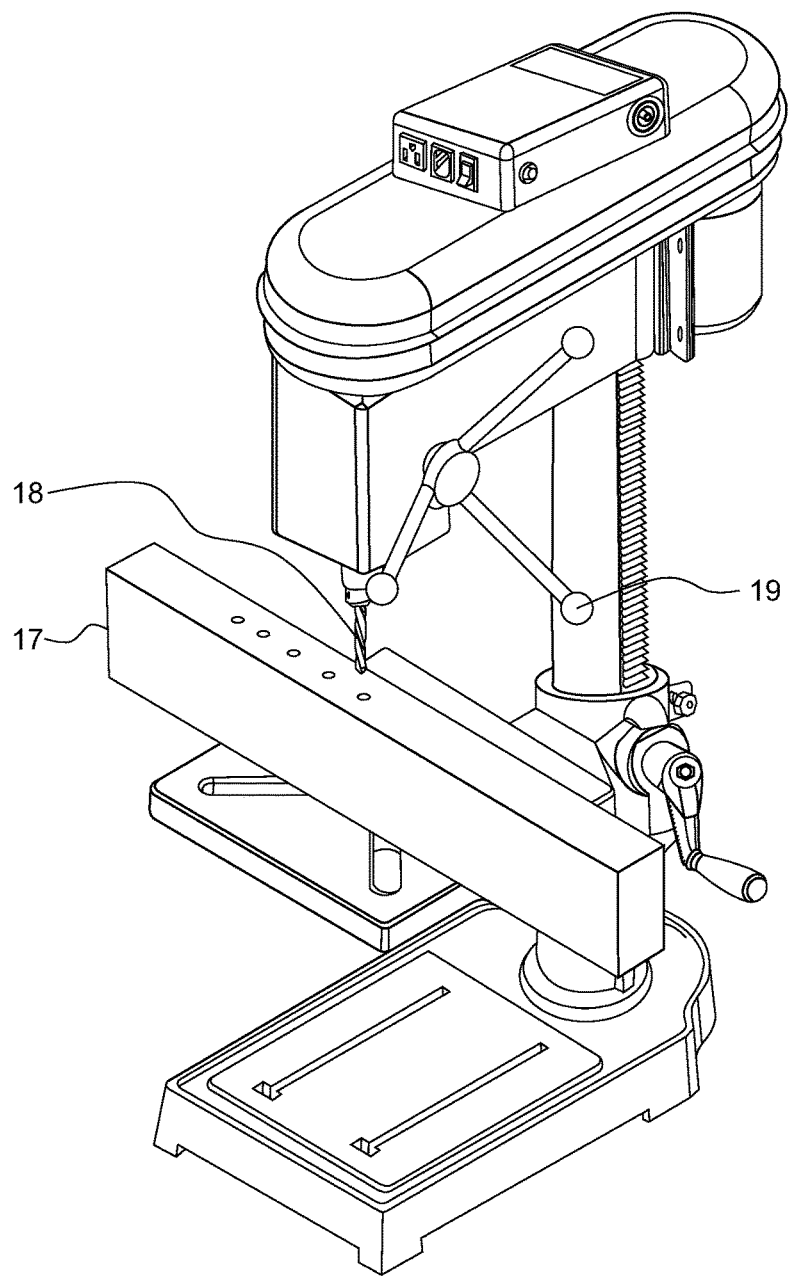
FIG. 2 is a graph showing sample results of the equipment utilization example performed with at least one embodiment of the present invention.

FIG. 2 shows a ¾" drill bit 18 connected to the drill press and a 4"×2" thick piece of wood 17 secured to the stand of the drill press.

Figure 3:
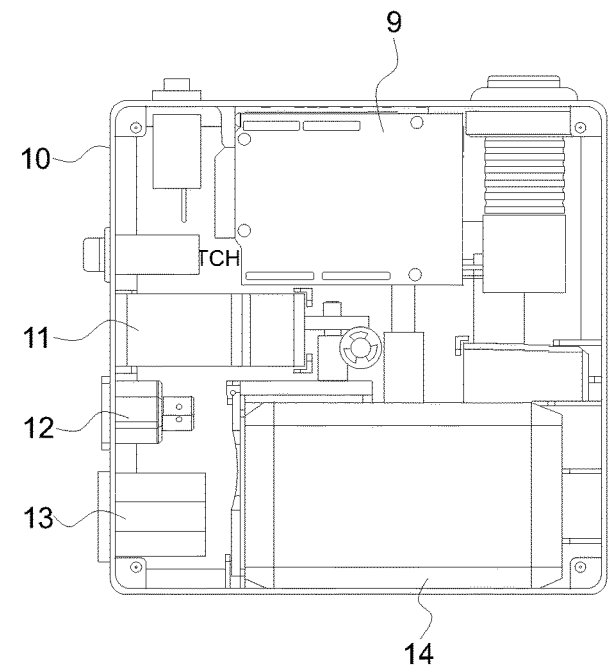
FIG. 3 shows an example of at least one embodiment of the invention including certain components of this embodiment.
Figure 3:
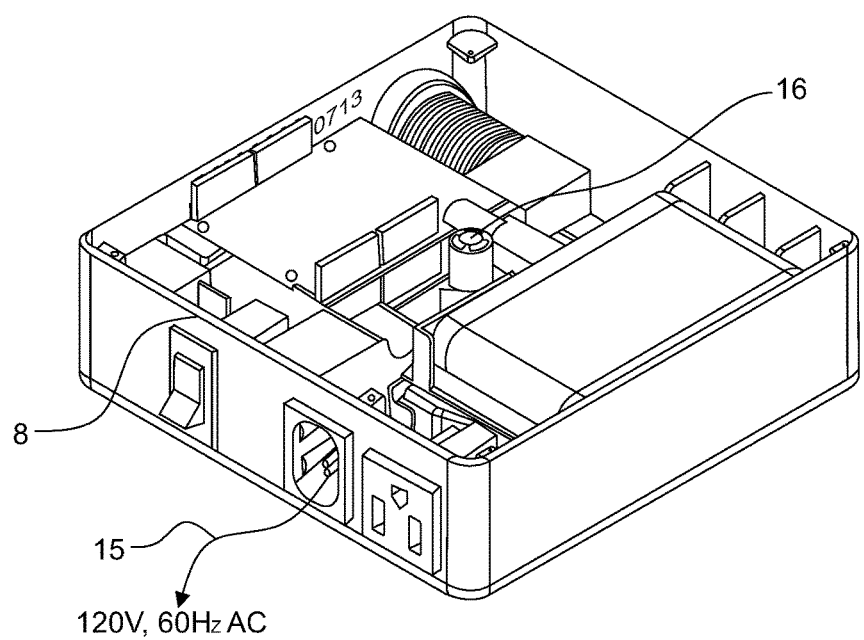

An embodiment of the device is shown in FIG. 3. An embodiment of the device was constructed with a microprocessor 9, two power supplies, a current transformer (CT) sensor 11, a thermistor and a transmitter 14 as shown in FIG. 3. The microprocessor consisted of an Adwino Main Board (Ardwino Part #A000066), Ardwino Wifi shield (Ardwino Part #A000058) as well as an Ardwino prototype Shield (Ardwino Part #A000082). The CT Sensor (YHDC Model #SCT-013-000) was connected to the microprocessor. The microprocessor connected to the transmitter (Sierra part #AC763S BK DT MTM) wirelessly via the Ardwino Wifi Shield. The microprocessor then sent information to a database via the internet. It is contemplated that any similar sensors, processors, components and transmitter may be used to enable embodiment of the invention as would be recognized by a person skilled in the art.

For the purposes of this example, an embodiment of the device was connected to a 120V, 60 Hz 15 A power supply and turned on. The drill press was turned on after 11 minutes and 25 second (11:25) and was left on for 15:16. After being on for 4:49 ¾" diameter holes were drilled into a 4"×2" thick piece of wood approximately 2" deep. The drill was lowered at a rate of 0.5"/sec. After each hole was drilled the drill bit was raised and the wood was repositioned to drill a new hole. This pattern was repeated for 1:13 at which point the drill bit was raised and left in place for 3:56. The drilling pattern was then repeated for an additional 0:37. The drill was then raised once again and left raised until the drill press was turned off.

The device's microprocessor received data from the thermistor regarding temperature and from the current transformer (CT) sensor regarding power consumption. Together, the data regarding temperature and the power consumption data, constitute data pertaining to the functionality of the drill press. This data was received by the microprocessor and converted into equipment utilization metrics. In this example, the selected equipment utilization metric was a graph of the power consumption and temperature against time as depicted in FIG. 4.

Figure 4:
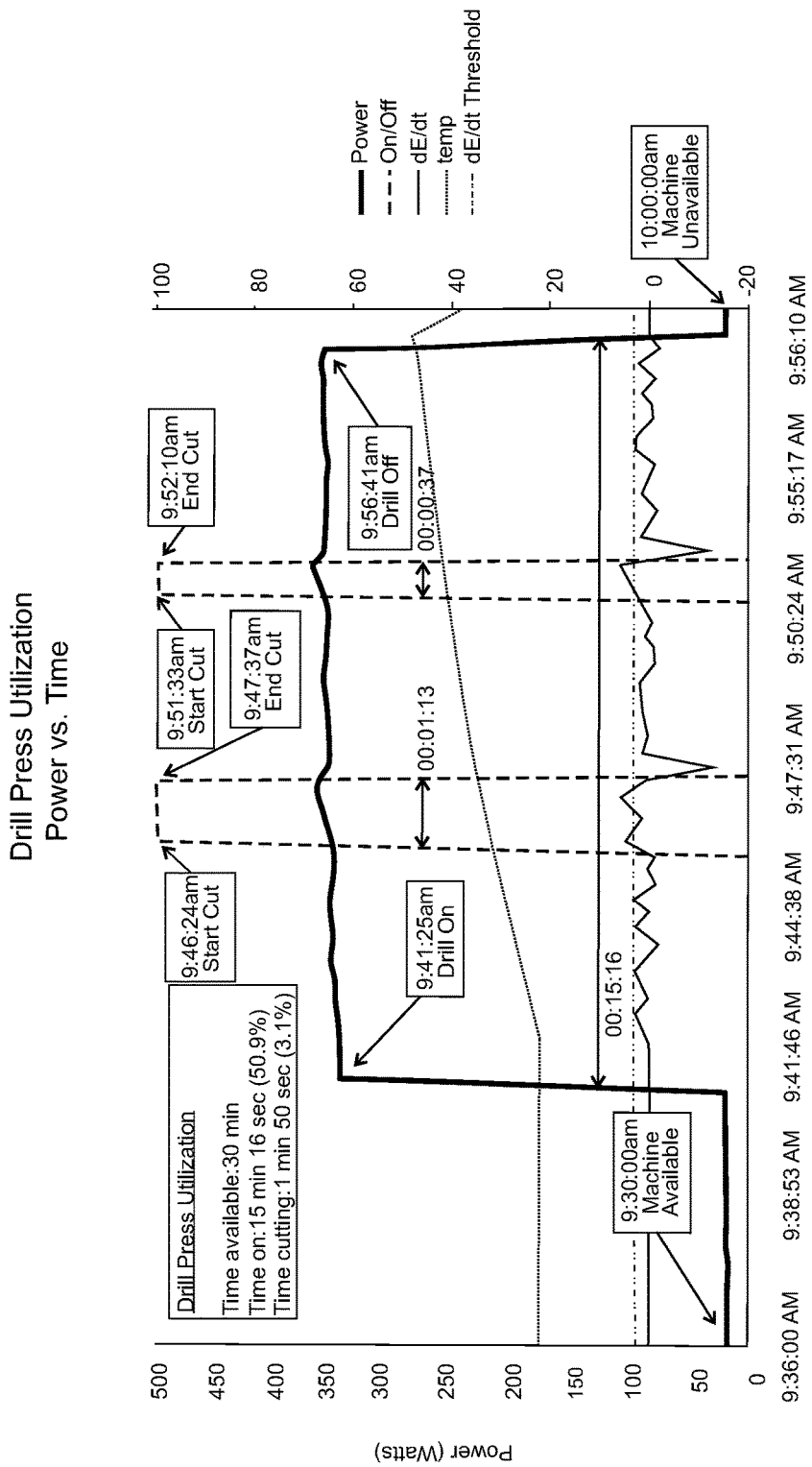
FIG. 4 shows at least one embodiment of a drill press setup used in connection with at least one embodiment of the present invention.

FIG. 4 shows the changes in power consumption during drilling compared to when the drill press was on an not drilling. FIG. 4 also shows the thermal changes detected on part of the drill press with the thermistor were able to identify when the drill press was turned on and off.

The equipment utilization metric was transmitted to a database accessible by the equipment operator.

The purpose of the present example was to monitor machine tool utilization and functionality without active communication from the equipment to the monitoring sensors. The two methods for detecting functionality in the present example were power consumption and thermal changes. The rationale for this is that the majority of industrial equipment does not have the capacity to transmit information pertaining to its utilization without customizing hardware and software of the industrial equipment and/or the system or device receiving the information. Both power consumption and temperature can be used to infer if the equipment is in use. By using passive methods to track utilization, the performance of most pieces of industrial or commercial equipment can be monitored.

Example 2—Measurement of Drill Press Utilization

An embodiment of the device is shown in FIG. 3 was constructed with a microprocessor 9, two power supplies, a current transformer (CT) sensor 11, a thermistor and a transmitter 14 as shown in FIG. 3. The microprocessor consisted of an Adwino Main Board (Ardwino Part #A000066), Ardwino Wifi shield (Ardwino Part #A000058) as well as an Ardwino prototype Shield (Ardwino Part #A000082). The CT Sensor (YHDC Model #SCT-013-000) was connected to the microprocessor. The microprocessor connected to the transmitter (Sierra part #AC763S BK DT MTM) wirelessly via the Ardwino Wifi Shield. The microprocessor then sent information to a database via the internet. It is contemplated that any similar sensors, processors, components and transmitter may be used to enable embodiment of the invention as would be recognized by a person skilled in the art.

Figure 5:
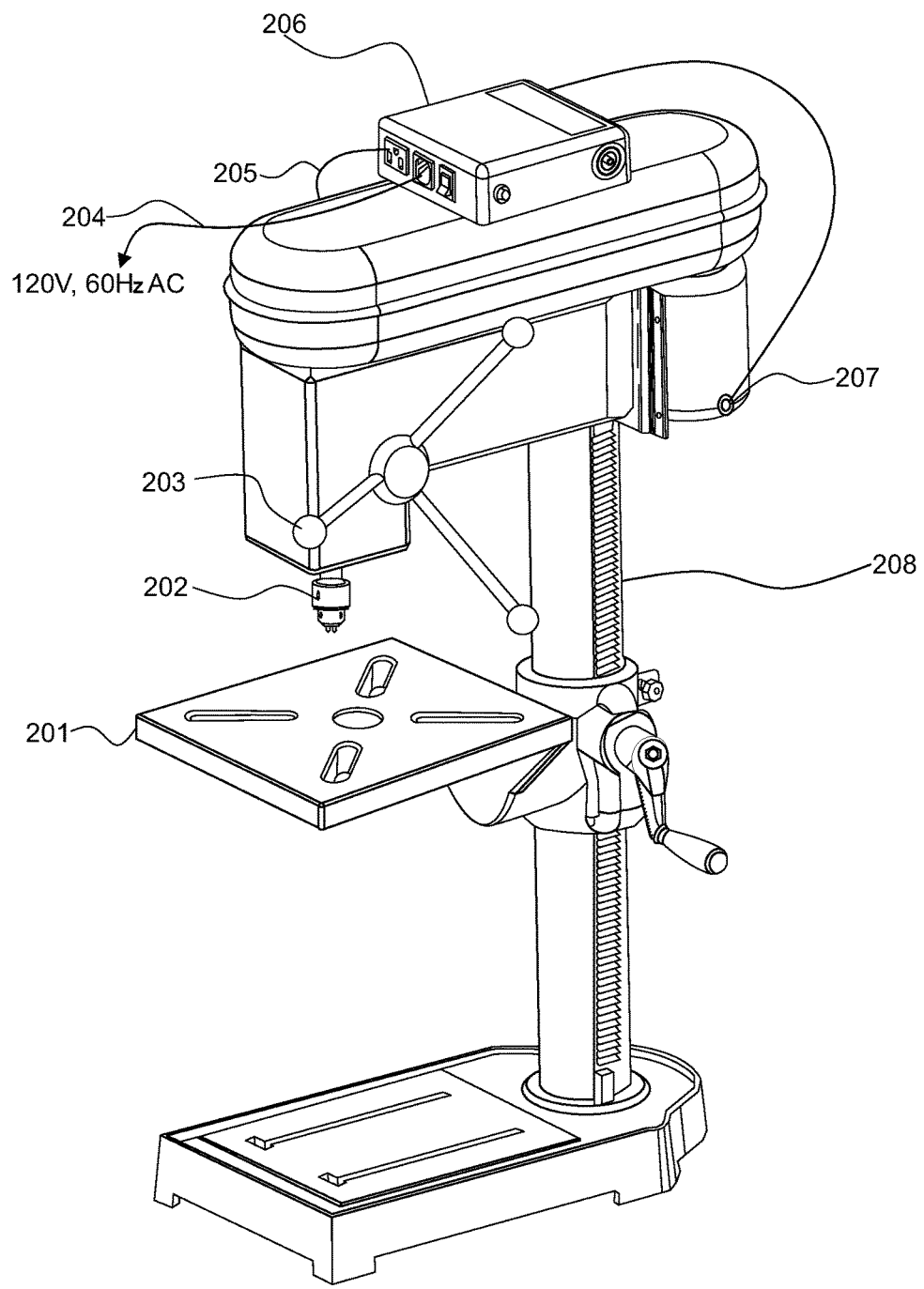
FIG. 5 is a photo of a forced air heater connected to at least one embodiment of the measurement device in accordance with the present invention.

An implementation of an embodiment of the invention for the measurement of drill press performance is shown in FIG. 5. FIG. 5 shows the power cord 205 of a 4.1 A 10″ drill press 208 (Mastercraft part #055-5509-2) connected to the NEMA 5-15 Receptacle and the power cable 204 for the device 206 was plugged into a standard 120V, 15 A wall outlet. The volume sensor 207 (inex Sound detector board, Product Code: RB-Inx-33) was connected to the metal housing of the spindle using adhesive tape and to the device 206.

For the purposes of the example, the device 206 monitored machine tool utilization and functionality data without active communication from the equipment to the monitoring sensor. The two methods for detecting functionality in this example were power consumption and sound volume changes, the data collected by the CT sensor and volume sensor constitute data pertaining to the functionality of the drill press. This data was received by the microprocessor and converted into equipment utilization metrics. In this example, the selected equipment utilization metric was a graph of the power consumption and sound against time as depicted in FIG. 6.

For the purposes of this example, an embodiment of the device 206 shown in FIG. 5 was connected to a 120V, 60 Hz 15 A power supply and turned on. A representative experiment, the results of which are depicted in FIG. 6, began at 01:00:00 am. At 01:05:25 am the drill press 208 was turned on and was left on for 2 minutes and 22 seconds at which point the drill press was turned off. At 01:10:49 am the drill press was turned on again and left on for 3 minutes and 2 seconds at which point it was turned off. At 01:25:45 am the drill press was tuned on and was left on for 5 minutes and 30 seconds.

Figure 6:
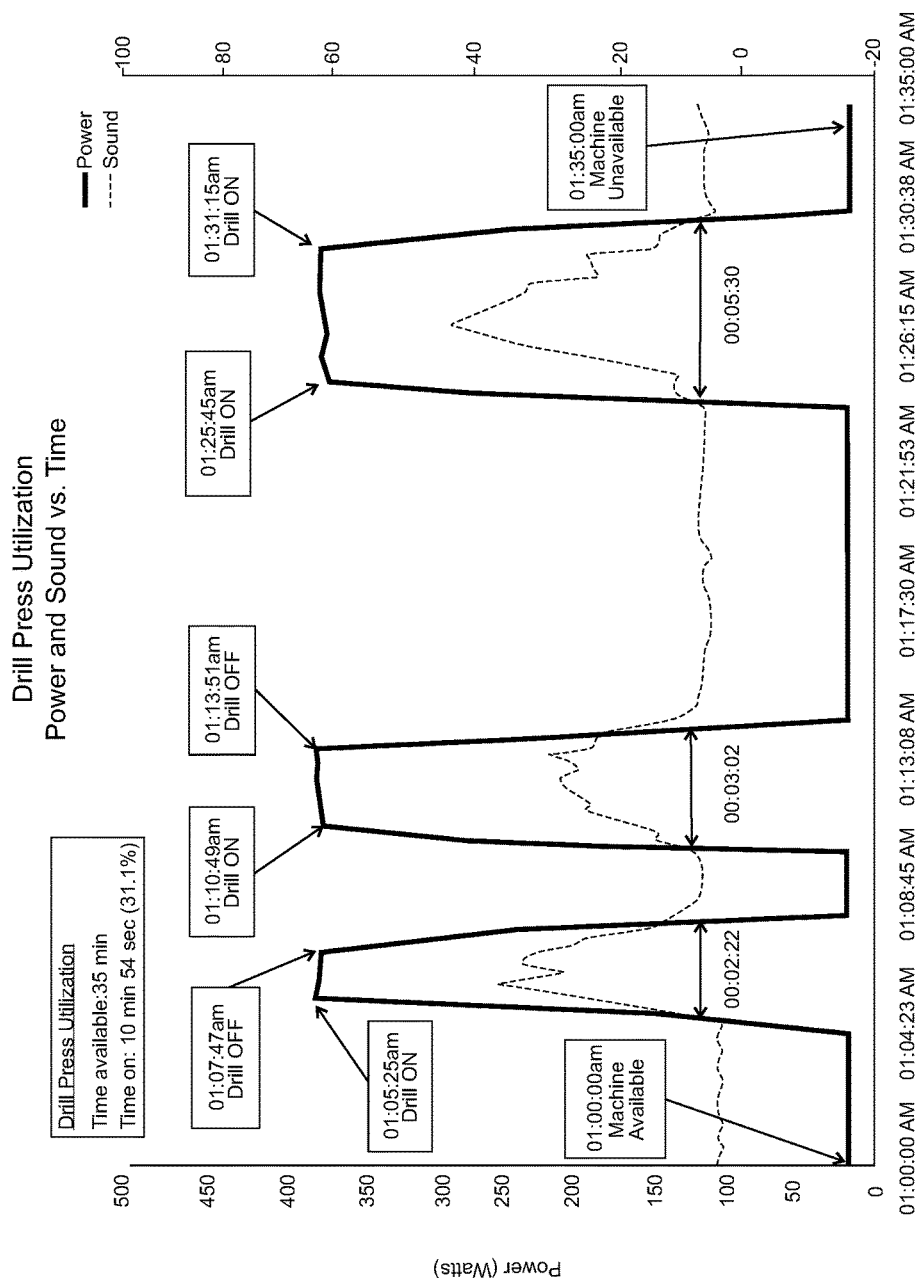
FIG. 6 is a graph showing representative results of the equipment utilization method relating to the measurement of forced air heater performance as illustrated in Example 3.

FIG. 6 shows the changes in power consumption during drilling compared to when the drill press was on an not drilling. FIG. 6 also shows the sound changes detected on part of the drill press with the sound sensor were able to identify when the drill press was turned on and off.

The equipment utilization metric was transmitted to a database accessible by the equipment operator.

The purpose of the present example was to monitor machine tool utilization and functionality without active communication from the equipment to the monitoring sensors. The two methods for detecting functionality in the present example were power consumption and thermal changes. The rationale for this is that the majority of industrial equipment does not have the capacity to transmit information pertaining to its utilization without customizing hardware and software of the industrial equipment and/or the system or device receiving the information. Both power consumption and sound can be used to infer if the equipment is in use. By using passive methods to track utilization, the performance of most pieces of industrial or commercial equipment can be monitored.

Example 3—Measurement of Forced Air Heater Performance

An embodiment of the device is shown in FIG. 3. An embodiment of the device was constructed with a microprocessor 9, two power supplies, a current transformer (CT) sensor 11, a thermistor and a transmitter 14 as shown in FIG. 3. The microprocessor consisted of an Adwino Main Board (Ardwino Part #A000066), Ardwino Wifi shield (Ardwino Part #A000058) as well as an Ardwino prototype Shield (Ardwino Part #A000082). The CT Sensor (YHDC Model #SCT-013-000) was connected to the microprocessor. The microprocessor connected to the transmitter (Sierra part #AC763S BK DT MTM) wirelessly via the Ardwino Wifi Shield. The microprocessor then sent information to a database via the internet. It is contemplated that any similar sensors, processors, components and transmitter may be used to enable embodiment of the invention as would be recognized by a person skilled in the art.

Figure 7:
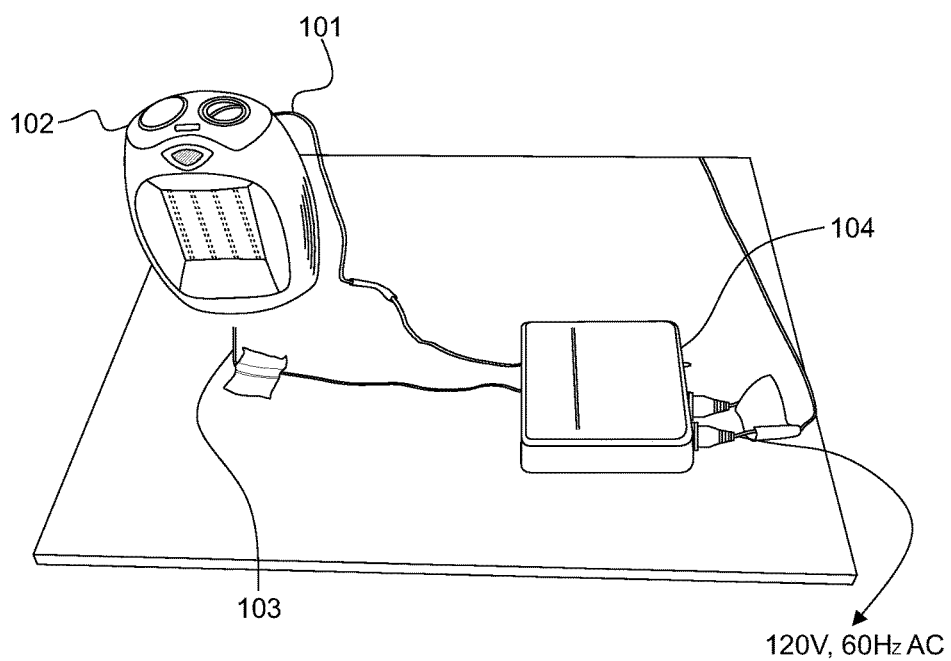
FIG. 7 is an isometric view of a drill press connected to a measurement device in accordance with at least one embodiment of the present invention.

An implementation of an embodiment of the invention for the measurement of drill press performance is shown in FIG. 7. FIG. 7 shows a forced air heater 102 (Everstar 1500 W ceramic heater, Model HPV-25), the air heater's power cord was connected to the NEMA 5-15 Receptacle of the device 104 and the power cable for the device was plugged into a standard 120V, 15 A wall outlet. The temperature sensor 103 was placed 4″ in front of the heater and oriented so that the temperature sensing element was 3″ off the surface of the table. The volume sensor 101 was connected to the back of the forced air heater close to the air-intake for the heater and to the device 104.

Figure 8:
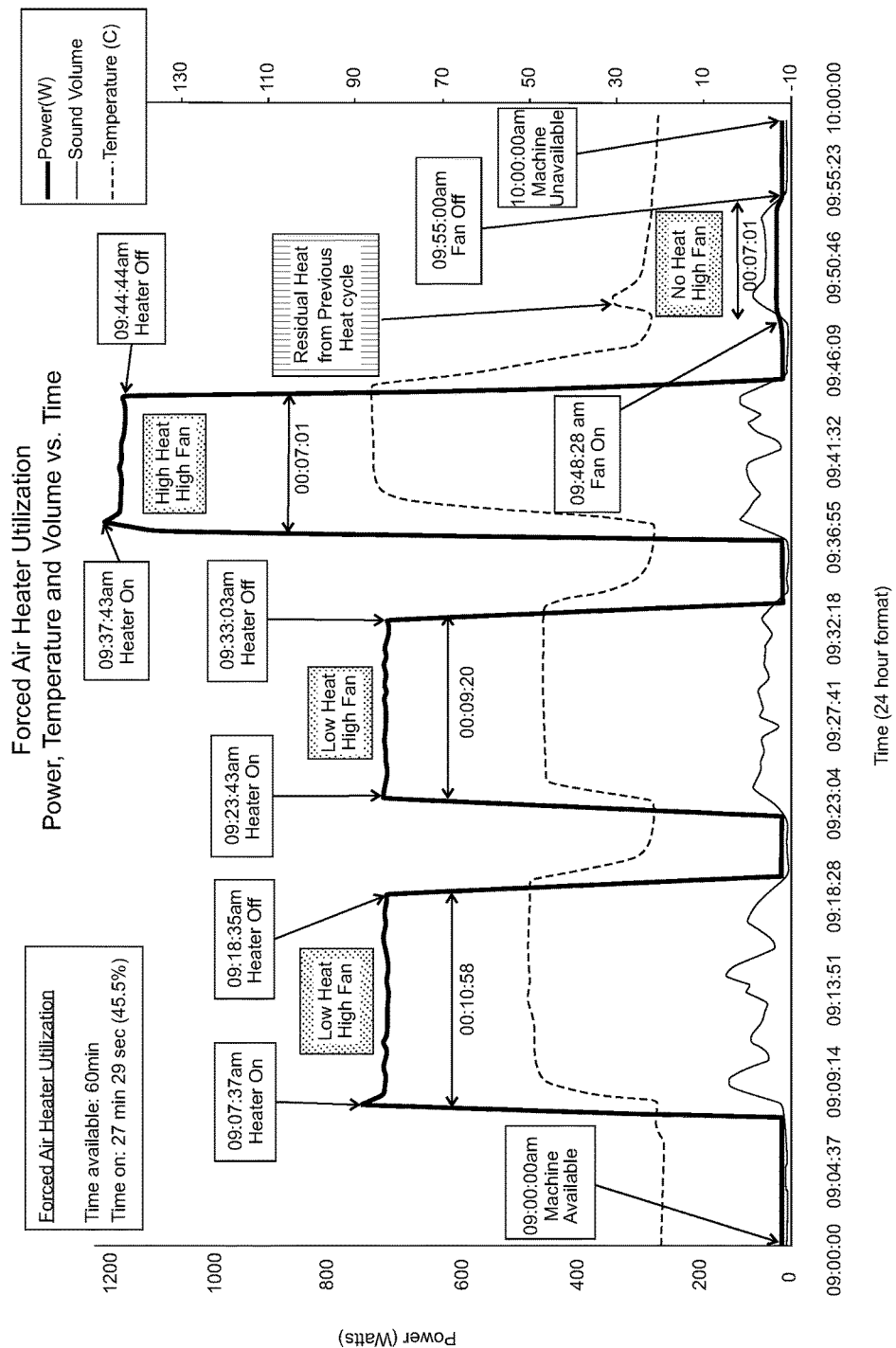
FIG. 8 is a graph showing representative results of the equipment utilization method relating to the measurement of drill press utilization as illustrated in Example 2.

An embodiment of the device 104 shown in FIG. 7 was connected to a 120V, 60 Hz 15 A power supply and turned on. A representative experiment, the results of which are depicted in FIG. 8, began at 9:00:00 am. After 7 minutes and 37 second the forced air heater 102 was turned on with the heat set to low and the fan set to high and was left on for 10 minutes and 58 seconds at which point it was turned off. At 9:23:43 the forced air heater 102 was turned on with the heat set to low and the fan set to high and was left on for 9 minutes and 20 seconds at which point it was turned off. At 9:37:43 the forced air heater 102 was turned on with the heat set to high and the fan set to high and was left on for 7 minutes and 1 second at which point it was turned off. At 9:48:28 the forced air heater 102 was turned on with the heat set to off and the fan set to high and was left on for 6 minutes and 32 seconds at which point it was turned off.

For the purposes of the example, the device monitored machine tool utilization and functionality without active communication from the equipment to the monitoring sensor. The three methods for detecting functionality in this example were power consumption, thermal changes and sound volume changes. The data collected by the CT sensor, the thermistor and volume sensor constitute data pertaining to the functionality of the drill press. This data was received by the microprocessor and converted into equipment utilization metrics. In this example, the selected equipment utilization metric was a graph of the power consumption, temperature and sound against time as depicted in FIG. 8.

The equipment utilization metric was transmitted to a database accessible by the equipment operator.

The rational for this is that the majority of industrial equipment does not have the capacity to transmit information pertaining to its utilization without customize hardware and software. Power consumption, sound volume, and temperature can be used to infer if the equipment is in use. By using passive methods to track utilization, the performance of any piece of industrial or commercial equipment can be monitored.

The results of this experiment, shown in FIG. 8, showed that change in power consumption could be used to identify if the heater was on and off and also was able to detect the 3 different states: 1-High Fan, Low Heat, 2-High Fan, High Heat, 3-High Fan, Heat off. The results also showed that the change in sound volume could also be used to identify if the heater is on or off. In this example, the changes in volume were similar for all states since the fan speed was maintained at the same level. The results also showed that change in temperature could be used to identify if the heater was on or off and also was able to detect 3 the different states: 1-High Fan, Low Heat, 2-High Fan, High Heat, 3-High Fan, Heat off. These results demonstrate that any of the three sensor methods tested could be used individually to determine equipment utilization. The sensors can also be used in conjunction to obtain more detailed information regarding equipment utilization.

This new technology has been described in terms of specific implementations and configurations which are intended to be exemplary only. Persons of ordinary skill in the art will appreciate that many obvious variations, refinements and modifications may be made without departing from the inventive concepts presented in this application. The scope of the exclusive right sought by the Applicant is therefore intended to be limited solely by the appended claims.

These claims, and the language used therein are to be understood in terms of the variants of the invention which have been described. They are not to be restricted to such variants, but are to be read as covering the full scope of the invention as is implicit within the invention and the disclosure that has been provided herein.

We claim:

1. A method for measuring and optimizing equipment performance, the method comprising:
    collecting data pertaining to functionality of one or more pieces of equipment by one or more sensors without interactive communication between said one or more sensors and said one or more pieces of equipment, said data pertaining to functionality of one or more pieces of equipment comprising time the one or more pieces of equipment are doing useful work and time the one or more pieces of equipment are idle, said one or more sensors to detect one or more of motion, temperature, light, and sound associated with equipment functionality;
    communicating said data pertaining to functionality of one or more pieces of equipment to a microprocessor;
    converting said data pertaining to functionality of one or more pieces of equipment using an algorithm within said microprocessor into equipment utilization metrics; and
    transmitting said equipment utilization metrics to an equipment operator by a transmitter;
    comparing equipment utilization metrics to known service intervals; and
    notifying an operator to perform preventive maintenance on the equipment.

2. The method of claim 1 wherein said one or more sensors are one or more sensors to measure temperature associated with equipment functionality.

3. The method of claim 1 wherein said one or more sensors are one or more sensors to measure one or more of the group including:
    sound frequency,
    sound pressure,
    sound pressure level,
    sound intensity, and
    sound power associated with equipment functionality.

4. The method of claim 1 wherein said one or more sensors are one or more sensors to measure light emitted or light intensity associated with equipment functionality.

5. The method of claim 1 wherein said one or more sensors are one or more of the group including:
    one or more sensors to measure equipment electrical energy consumption,
    one or more sensors to measure change in electrical current consumption associated with equipment functionality;
    one or more sensors to measure temperature associated with equipment functionality,
    one or more sensors to detect motion associated with equipment functionality,
    one or more sensors to detect sound frequency, sound pressure, sound pressure level, sound intensity or sound power associated with equipment functionality,
    one or more sensors to detect emitted light or light intensity associated with equipment functionality,
    one or more sensors to detect air flow associated with equipment functionality,
    one or more sensors to detect mechanical forces associated with equipment functionality, and
    one or more sensors to detect electro-magnetic radiation associated with equipment functionality.

6. The method of claim 5 wherein said one or more sensors comprise one or more sensors to detect motion associated with equipment functionality wherein said motion is detected optically.

7. The method of claim 5 wherein said one or more sensors comprise one or more sensors to detect motion associated with equipment functionality wherein said motion is detected using video cameras.

8. The method of claim 5 wherein said one or more sensors comprise one or more sensors to detect motion associated with equipment functionality wherein said motion is detected using a photodiode.

9. The method of claim 5 wherein said one or more sensors comprise one or more sensors to detect motion associated with equipment functionality wherein said motion is detected using an accelerometer.

10. The method of claim 5 wherein said one or more sensors comprise one or more sensors to detect motion associated with equipment functionality wherein said motion is detected using a GPS transmitter.

11. The method of claim 5 further comprising the steps of:
    comparing said equipment utilization metrics to equipment maintenance intervals of said equipment using said algorithm within said microprocessor to generate equipment maintenance metrics; and
    transmitting a maintenance notification to said equipment operator regarding scheduled preventative maintenance wherein said maintenance notification includes equipment maintenance metrics.

12. The method of claim 1 wherein said one or more sensors comprise a plurality of sensors used in conjunction to algorithmically define equipment utilization metrics.

13. The method of claim 12 further comprising the steps of:
    comparing said equipment utilization metrics to equipment maintenance intervals of said equipment using said algorithm within said microprocessor to generate equipment maintenance metrics; and transmitting a maintenance notification to said equipment operator regarding scheduled preventative maintenance wherein said maintenance notification includes equipment maintenance metrics.

14. The method of claim 1 further comprising the steps of:

comparing said equipment utilization metrics to equipment maintenance intervals of said equipment using said algorithm within said microprocessor to generate equipment maintenance metrics; and transmitting a maintenance notification to said equipment operator regarding scheduled preventative maintenance wherein said maintenance notification includes equipment maintenance metrics.

15. A device for measuring and optimizing equipment performance, the device comprising:

one or more sensors that measure functionality of equipment without interactive communication between said one or more sensors and said equipment and generate and transmit data related to functionality of said equipment, said one or more sensors to detect one or more of motion, temperature, light, and sound associated with equipment functionality;

a microprocessor containing an algorithm for receiving said data related to functionality of said equipment, converting said data related to functionality of said equipment into equipment utilization metrics and transmitting said equipment utilization metrics; and a transmitter for receiving said equipment utilization metrics and transmitting said equipment utilization metrics to an equipment operator as a maintenance notification regarding scheduled preventative maintenance.

16. The device of claim 15 wherein said one or more sensors are one or more of the group including:

one or more sensors to measure equipment electrical energy consumption, one or more sensors to measure change in electrical current consumption associated with equipment functionality;

one or more sensors to measure temperature associated with equipment functionality, one or more sensors to detect motion associated with equipment functionality, one or more sensors to detect sound frequency, sound pressure, sound pressure level, sound intensity or sound power associated with equipment functionality, one or more sensors to detect emitted light or light intensity associated with equipment functionality, one or more sensors to detect air flow associated with equipment functionality, one or more sensors to detect mechanical forces associated with equipment functionality, and one or more sensors to detect electro-magnetic radiation associated with equipment functionality.

17. The device of claim 16 wherein said one or more sensors comprise one or more sensors to detect motion associated with equipment functionality wherein said motion is detected by one or more of the group including:

one or more video cameras,
one or more photodiodes,
one or more accelerometers; and
one or more GPS transmitters.

18. The device of claim 15 wherein said one or more sensors comprise one or more sensors to detect motion associated with equipment functionality wherein said motion is detected by one or more of the group including:

one or more video cameras,
one or more photodiodes,
one or more accelerometers; and
one or more GPS transmitters.

* * * * *